United States Patent [19]

Dimitrov et al.

[11] 4,226,750
[45] Oct. 7, 1980

[54] PROCESS FOR PREPARING MODIFIED PLASTIC MATERIALS

[75] Inventors: Miklós Dimitrov; Franciska K. Keleman nee Gulyas; Richárd Markó; Tamás Pazonyi; Béla Pukánszky; András Riczkó, all of Budapest, Hungary

[73] Assignee: Muanyagipari Kutato Intezet, Budapest, Hungary

[21] Appl. No.: 915,292

[22] Filed: Jun. 13, 1978

[30] Foreign Application Priority Data

Jun. 15, 1977 [HU] Hungary .............................. MU 588

[51] Int. Cl.² .......................... C08K 5/00; C08K 5/01; C08K 5/09
[52] U.S. Cl. .............................. 260/23 H; 260/23 XA; 260/23 S; 260/28.5 A; 260/33.6 UA; 260/33.6 PQ; 260/42.54; 260/42.56; 260/DIG. 17; 260/DIG. 21; 525/1
[58] Field of Search .............. 260/23 H, 23 XA, 23 S, 260/33.6 UA, 33.6 PQ, 878 R, 884, 897 C, DIG. 17, DIG. 21, 42.54, 42.56, 28.5 A; 525/1

[56] References Cited

U.S. PATENT DOCUMENTS

| | | | |
|---|---|---|---|
| 2,099,513 | 11/1937 | De Simo et al. | 260/DIG. 21 |
| 3,503,922 | 3/1970 | Carton | 260/42.56 |
| 3,658,752 | 4/1972 | Das et al. | 260/42.56 |
| 3,935,150 | 1/1976 | Oxe et al. | 260/DIG. 21 |
| 3,956,213 | 5/1976 | Hefele | 260/23 H |
| 3,988,285 | 10/1976 | De Vrieze | 260/23 H |
| 4,020,228 | 4/1977 | Eastes | 260/23 H |
| 4,039,507 | 8/1977 | Paige et al. | 260/33.6 PQ |
| 4,041,002 | 8/1977 | Aboshi et al. | 260/33.6 UA |
| 4,051,096 | 9/1977 | Koseki et al. | 260/897 C |
| 4,059,650 | 11/1977 | Slama et al. | 525/1 |
| 4,086,297 | 4/1978 | Rei et al. | 260/897 C |
| 4,095,031 | 6/1978 | Engle | 525/1 |
| 4,097,554 | 6/1978 | Yui | 260/878 R |
| 4,141,876 | 2/1979 | Hansen | 525/1 |
| 4,150,013 | 4/1979 | Punderson | 525/1 |

*Primary Examiner*—Ronald W. Griffin
*Attorney, Agent, or Firm*—Young & Thompson

[57] ABSTRACT

Two plastics which were heretofore impossible to combine, can be combined with each other if the one to be added is converted to a porodin gel by heating the same at a temperature of at least 180° C. with a substance that does not dissolve the polymer, and then cooling to below 120°. The porodin gel can then be easily admixed with the other plastic material in an amount of 1 to 50% by weight, preferably 5 to 20% by weight based on the weight of the modified plastic material. Examples are the incorporation of polyethylene or polypropylene or polymethyl methacrylate in polyvinyl chloride, or the incorporation of polystyrene in polypropylene, or the incorporation of polymethyl methacrylate in polyethylene.

6 Claims, No Drawings

PROCESS FOR PREPARING MODIFIED PLASTIC MATERIALS

This invention relates to a process for the modification of a plastics material.

It is known that plastics construction materials, presently manufactured in large quantities, do not in many cases meet the desired requirements for a particular application. Consequently, the desired properties are frequently achieved by the use of modifying additives.

The modifying additives currently employed are mostly polymeric in nature and, owing to the different inherent processing properties of the base polymer and modifying polymer, the two can be mixed together only in a limited number of combinations and within limited concentrations. Thus, hitherto two or more plastics could be combined only if they were miscible with one another and could be processed under similar conditions. In such processes therefore, either the processing properties of the base polymer and modifying polymer are very close to one another for example, as in the PVC-polystyrene system described in Canadian Pat. No. 555,261 and PVC-ABS systems (Kunststoffe 56, 707, 1966), or alternatively the modifying polymer has a substantially lower softening point than the base polymer, as, for example, in the copolymer systems PVC-nitrile rubber (French Pat. No. 1,216,523) and PVC-ethylene vinyl acetate (British Pat. No. 927,174). With the currently known processes it is virtually impossible to modify the base polymer directly with a polymer which is substantially more difficult to process and has a higher softening range. However, it is with products modified in this very way that construction materials with numerous favourable properties could be made.

The present invention is based on the surprising discovery that arbitrarily selected polymers may be combined to produce modified plastics material with novel properties if a porodin gel is first prepared from the modifying polymer and then added to the base polymer.

Thus, according to the present invention, there is provided a process for the modification of a plastics material which comprises forming a homogeneous mixture from one or more modifying plastics polymers and a substance which does not dissolve the modifying polymer(s) at ambient temperature or a mixture thereof with a solvent, at a temperature of at least 180° C, whereby a porodin gel is obtained and mixing said porodin gel, at a temperature below 120° C, with the plastics material to be modified in an amount of from 1 to 50% by weight based on the modified plastics material.

The porodin gel can be made by dispersing the modifying polymer in a medium boiling above 180° C. which does not dissolve the modifying polymer at ambient temperature, yet forms therewith a homogeneous phase at correspondingly high temperatures. This condition is also satisfied by mixtures in which there is a constituent dissolving the modifying polymer even at ambient temperature. In the preparation of the porodin gel the dispersing phase is selected so that, when the homogeneous melt is cooled, the polymer is separated in microdispersed form (no macroscopic phase separation taking place) and a pasty or solid, macroscopically homogeneous substance is obtained.

The porodin gel thus prepared is then added to the base polymer, preferably at ambient temperature and preferably in an amount of from 5 to 20% by weight based on the modified plastic material. The fact that the porodin gel is suitable for the manufacture of modified plastics material is surprising in that it enables polymers having completely different chemical structures and polarities to be combined; the product obtained from them remains homogeneous and even after prolonged periods shows no phase separation which would impair the physical and mechanical properties of the final product.

The porodin gel of the modifying polymer, prepared in a high-boiling dispersing medium, may be mixed with the plastics material to be modified by means of any of the conventional mixing processes. The product thus formed can then be further processed according to known methods of plastics processing.

As mentioned above a particular advantage of the process according to the invention is that it enables polymers which differ fundamentally in their chemical structure and their processing properties to be combined whilst substantially avoiding phase separation, fibrousness and scaling which have hitherto occured in the melt during combination. The process according to the invention thus enables the base polymer and modifying polymer to be selected, as desired, according to the modified properties which are to be obtained, which properties may be selected from a wide range hitherto not possible to attain. Further the processability of the polymers is greatly improved and the energy required for processing is reduced. The better processability of polymers prepared according to the invention avoids the necessity of using lubricating agents otherwise necessary in the working of plastics materials such as PVC.

In addition the polymer used as the modifying additive can be both a thermoplastic and an elastomer.

By the process according to the invention, for example, apolar polypropylene, whose softening point is known to be high, can be combined with low-polar polystyrene softening at a low temperature; polypropylene can, in the form of a porodin gel, even be combined with PVC. Combination according to the invention of polymers hitherto impossible to combine results in a completely novel substance morphology. This is illustrated, for example, by the abnormal variation in the electrical properties of the product which is expressed by a change in the electrical insulating properties. Thus, by addition of a porodin gel prepared from polyethylene or polypropylene, the volume resistivity of PVC can be reduced by several orders of magnitude.

The following non-limiting Examples serve to illustrate the present invention.

EXAMPLE 1

Manufacture of anti-static rigid PVC 50 parts by weight of polyethylene of low density and 50 parts by weight of paraffin oil are stirred in an autoclave for 60 minutes at 200° C. under a nitrogen atmosphere. The homogeneous melt thus formed is cooled with stirring to 150°C, then extruded from the autoclave and cooled to ambient temperature, whereby a porodin gel is formed therefrom. 6 parts by weight of this porodin gel are mixed with 94 parts by weight of suspension PVC powder and with the conventional quantity of stabilisers used in PVC processing, for example, with 3 parts by weight of tribasic lead sulphate. The porodin gel is distributed completely homogeneously by high speed mixing. The modified plastics product obtained can be further processed either directly or after granulation by extrusion, injection moulding or in any other known way. In contrast to rigid PVC, whose volume resistivity is 1.18×10¹⁵ ohm cm, structural parts made from the product prepared according to the invention have a volume resistivity of 1.25×10¹¹ ohm cm, i.e. they show anti-static properties.

EXAMPLE 2

Manufacture of non-freezing polypropylene 70 parts by weight of polystyrene and 30 parts by weight of stearin are stirred in an autoclave for 80 minutes at 220° C. under a nitrogen atmosphere. The homogeneous melt formed is cooled with stirring to 150° C, extruded from the autoclave and cooled further to ambient temperature. 10 parts by weight of the porodin gel obtained are mixed in a vibrating mixer with 90 parts by weight of polypropylene. The product obtained can be further processed either directly or after granulation by extrusion, injection moulding or in any other known way. The impact strength of the modified polypropylene (according to Charpy, measured to Hungarian standard MSZ 7751-61) amounts to 78 cmkg/cm² at −10° C. without a break, whereas that of non-modified polypropylene lies around 46 cmkg/cm².

EXAMPLE 3

Manufacture of rigid PVC with enhanced flow properties 70 parts by weight of polymethyl methacrylate, 20 parts by weight of stearin and 10 parts by weight of dibutyl phthalate are stirred in an autoclave for 60 minutes at 240° C. under a nitrogen atmosphere. The melt is cooled with stirring to 150° C, extruded from the autoclave and then cooled further to ambient temperature. The solid porodin gel obtained is ground and 5 parts by weight of the ground material are homogenised in a high-speed mixer together with 95 parts by weight of suspendable PVC and a stabiliser conventional in PVC processing, for example, 2 parts by weight of barium cadmium stearate. The mixture obtained can be further processed either directly or after granulation by extrusion, injection moulding or in any other known way. Even without the addition of lubricants the dynamic melt viscosity of the modified rigid PVC, measured at 180° C., is less by at least one order of magnitude than that of the non-modified product. When processed by injection moulding, the modified PVC does not show the surface defects (wrinkling) which otherwise occur, but presents a glossy, uniform surface free of defects.

EXAMPLE 4

Manufacture of high-density polyethylene resistant to stress cracking 60 parts by weight of polymethyl methacrylate, 10 parts by weight of polystyrene, 20 parts by weight of stearin and 10 parts by weight of paraffin oil are stirred in an autoclave for 70 minutes at 230° C. under a nitrogen atmosphere. The melt is cooled with stirring to 150° C., extracted from the autoclave and then cooled further to ambient temperature. The solid porodin gel obtained is ground and 15 parts by weight of the ground material are mixed in a mixing drum together with 85 parts by weight of high-density polyethylene. The mixture obtained can be processed either directly or after granulation by extrusion, injection moulding or in any other way. Resistance to surface deterioration (measured to ASTM D 1693) amounts to at least 600 hours, while the value of the non-modified product lies around 5-25 hours.

What we claim is:

1. A process for the modification of a plastics material which comprises forming a homogeneous mixture from one or more modifying plastics polymers and a substance which does not dissolve the modifying polymer(s) at ambient temperature or a mixture thereof with a solvent, at a temperature of at least 180° C., cooling the mixture to below 120° C. whereby a porodin gel is obtained and mixing said porodin gel, at a temperature below 120° C., with the plastics material to be modified in an amount of from 1 to 50% by weight based on the modified plastics material.

2. A process as claimed in claim 1 wherein the porodin gel is mixed with the plastics material to be modified at ambient temperature.

3. A process as claimed in claim 1 wherein the porodin gel is mixed with the plastics material to be modified in an amount of from 5 to 20% by weight based on the modified plastics material.

4. A process as claimed in claim 1 wherein the modifying polymer is polyethylene or polypropylene or polymethyl methacrylate and the plastics material to be modified is polyvinyl chloride.

5. A process as claimed in claim 1 wherein the modifying polymer is polystyrene and the plastics material to be modified is polypropylene.

6. A process as claimed in claim 1 wherein the modifying polymer is polymethyl methacrylate and the plastics material to be modified is polyethylene.

* * * * *